US011934381B2

(12) United States Patent
Kt et al.

(10) Patent No.: US 11,934,381 B2
(45) Date of Patent: Mar. 19, 2024

(54) DATA CONSISTENCY ANALYZER

(71) Applicant: SAP SE, Walldorf (DE)

(72) Inventors: Sreedhara Kt, Bangalore (IN); Sushil Kumar, Bangalore (IN); Praveen Kumar P, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/736,552

(22) Filed: May 4, 2022

(65) Prior Publication Data
US 2023/0359609 A1 Nov. 9, 2023

(51) Int. Cl.
| G06F 7/00 | (2006.01) |
| G06F 16/215 | (2019.01) |
| G06F 16/23 | (2019.01) |
| G06F 16/27 | (2019.01) |
| G06F 16/28 | (2019.01) |

(52) U.S. Cl.
CPC ........ *G06F 16/2365* (2019.01); *G06F 16/215* (2019.01); *G06F 16/273* (2019.01); *G06F 16/285* (2019.01)

(58) Field of Classification Search
CPC .. G06F 16/2365; G06F 16/273; G06F 16/285; G06F 16/215
USPC ................................................. 707/600–899
See application file for complete search history.

(56) References Cited

U.S. PATENT DOCUMENTS

| 7,908,249 | B1 * | 3/2011 | Gupta ................. G06F 16/2365 |
| | | | 707/665 |
| 2008/0255865 | A1 | 10/2008 | Ritter et al. |

(Continued)

FOREIGN PATENT DOCUMENTS

| AU | 2020101475 A4 | 8/2020 |
| CN | 105913195 A | 8/2016 |

OTHER PUBLICATIONS

"Business Impact Analysis", StackState, [Online]. Retrieved from the Internet: <URL: https://www.stackstate.com/use-cases/business-impact-analysis>, (Accessed Feb. 11, 2022), 7 pgs.

(Continued)

*Primary Examiner* — Isaac M Woo
(74) *Attorney, Agent, or Firm* — SCHWEGMAN LUNDBERG & WOESSNER, P.A.

(57) ABSTRACT

A data consistency analyzer identifies data inconsistencies proactively, providing insights into the financial, business, and technical impact to enable users to make decisions regarding resolution of the inconsistencies. The data consistency analyzer may provide additional insights such as criticality of inconsistencies. Data inconsistencies may be caused by configuration changes to master data. As described herein, data consistency is improved by keeping a constant watch on various master data changes which is one of the major sources towards causing inconsistency and taking necessary actions based on further assessments. Using master data change as initial lead, the inconsistencies would be identified that are not mere database or technical inconsistencies. Along with the primary option of inconsistency check based on master data change, additional options to scan the system based on overall run and run per selection, or application level specific checks will be provided.

20 Claims, 12 Drawing Sheets

(56) References Cited

U.S. PATENT DOCUMENTS

2015/0073949 A1\* 3/2015 Armstrong ............ G06Q 40/12
705/30
2021/0271652 A1\* 9/2021 Borsos .................... G06F 16/44

OTHER PUBLICATIONS

"Business Impact Analysis (BIA)", IT Service Management Office, The Regents of the University of California, [Online]. Retrieved from the Internet: <URL: https://itsm.ucsf.edu/business-impact-analysis-bia-0>, (Accessed Feb. 11, 2022), 9 pgs.

"Business Impact Analysis Application", LogicGate, Inc., [Online]. Retrieved from the Internet: <URL: https://www.logicgate.com/applications/business-impact-analysis/>, (Accessed Feb. 11, 2022), 6 pgs.

"The rise of intelligent operations—A collection of insights and perspectives", Genpact Research Institute, [Online]. Retrieved from the Internet: <URL: https://www.genpact.com/exclusive-content/The-rise-of-intelligent-operations-BFS.pdf>, (Accessed Feb. 11, 2022), 188 pgs.

Borek, Alexander, et al., "Transactional Data", Total Information Risk Management, Science Direct Topics, [Online]. Retrieved from the Internet: <URL: https://www.sciencedirect.com/topics/computer-science/transactional-data>, (2014), 18 pgs.

Hurd, C J, "The Importance of a Business Impact Analysis", Compass IT Compliance, LLC, [Online]. Retrieved from the Internet: <URL: https://www.compassitc.com/blog/business-impact-analysis>, (Apr. 6, 2019), 3 pgs.

\* cited by examiner

|  | TRANSACTION TABLE | | | | |
|---|---|---|---|---|---|
| ID | TYPE | DATE | VALUE | CURRENCY | OPEN ITEM |
| 1 | INVOICE | 2020-12-13 | 12.05 | DOLLAR | N |
| 2 | PAYMENT | 2021-01-15 | 12.05 | DOLLAR | N |
| 3 | INVOICE | 2021-02-04 | 33.33 | DOLLAR | N |
| 4 | PAYMENT | 2021-02-04 | 33.33 | EURO | N |
| 5 | INVOICE | 2021-02-06 | 33.33 | EURO | Y |
| 6 | PAYMENT | 2021-02-07 | 33.33 | EURO | N |

FIG. 3

DATA CONSISTENCY ANALYZER

TECHNICAL FIELD

The subject matter disclosed herein generally relates to data consistency. Specifically, the present disclosure addresses systems and methods for identifying and analyzing data inconsistencies.

BACKGROUND

Systems may not operate as intended due to data inconsistencies. Intensive user investigation is undertaken to identify the inconsistent data, determine the appropriate correction, and apply the correction.

BRIEF DESCRIPTION OF THE DRAWINGS

FIG. 3 is a block diagram of an example database schema suitable for access by a data consistency analyzer.

DETAILED DESCRIPTION

Figure 1:
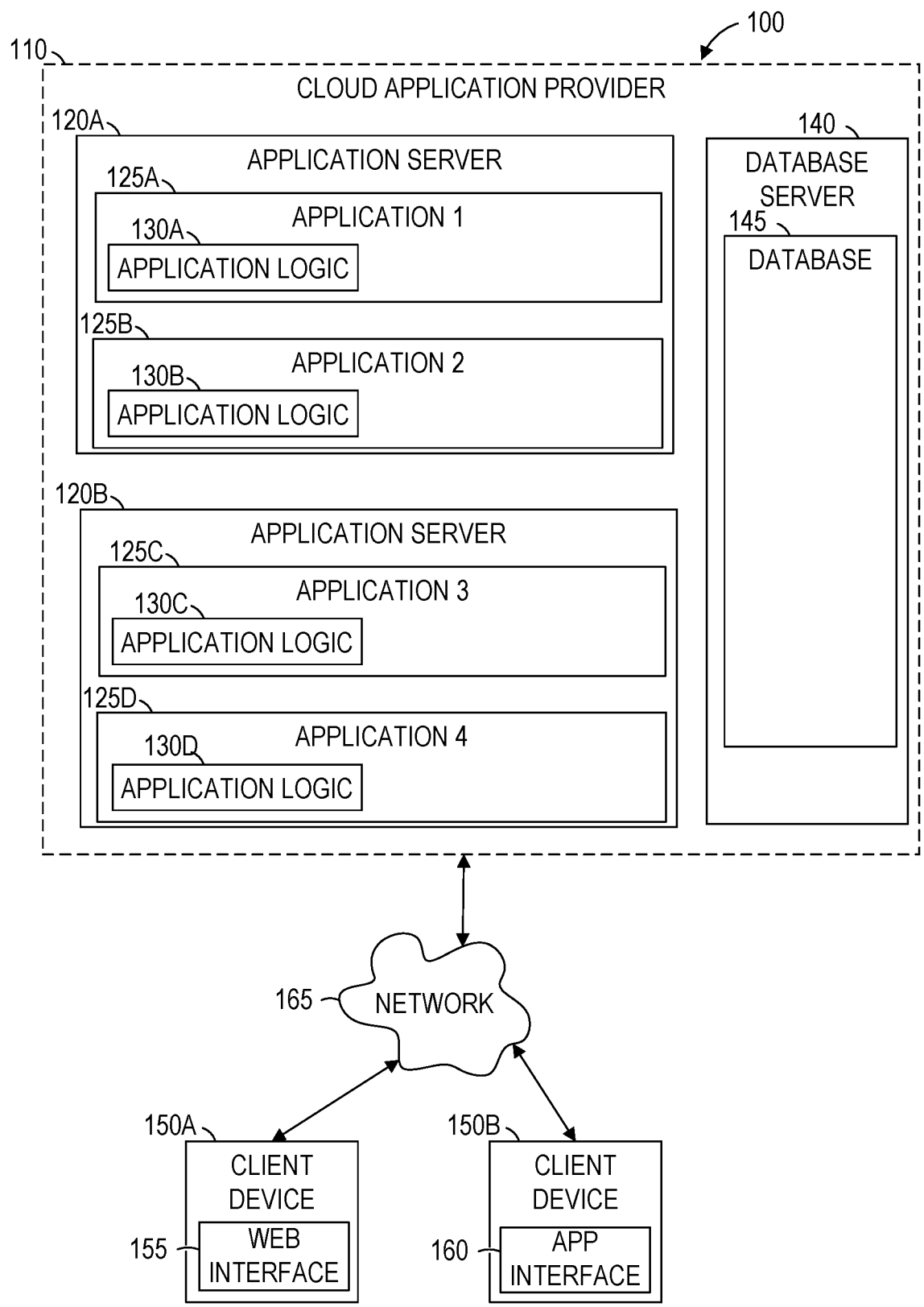
FIG. 1 is a network diagram illustrating an example network environment suitable for a data consistency analyzer.

Data consistency in a software system is key to running processes without error. An inconsistency in the data could cause a) financial impacts such as incorrect internal and legal reporting, b) business impacts such as the inability to complete a business transaction such as postings, payments and clearings, book closing activities, and c) technical impacts such as broken data records that may or may not cause a severe impact on business.

As described herein, a data consistency analyzer identifies data inconsistencies proactively, providing insights into the financial, business, and technical impacts to enable users to make decisions regarding resolution of the inconsistencies. For example, certain inconsistencies pose major threat for the day-to-day operations and businesses, which should be mitigated as a high priority. As another example, some inconsistencies may not carry any serious risk and have limited or no impact on the business even if not resolved. The data consistency analyzer may provide additional insights such as the criticality of the inconsistencies.

Data inconsistencies may be caused by configuration changes to master data. At times, to cope with changing business needs, master data and transactional data changes are performed in non-recommended ways leading to data inconsistencies. Such changes often go unrecognized until business operations are impacted, as they are not mere database or technical inconsistencies. With the growing transactional data, it is often difficult to keep the system clean and consistent, and to identify the root causes and prevent them in the future. Response to such situations is often reactive, requiring analysis of the data patterns and corrective actions. This process is time consuming, needs deep business and technical expertise, and impacts the ongoing business processes.

Non-recommended ways of changes to general ledger (G/L) account master data in a financial system may cause data inconsistencies. For example, G/L accounts are managed as open item management if there is a need to check whether there is an offsetting posting for a given business transaction. Open item management functionality is used for bank clearing accounts, clearing accounts for goods receipt/invoice receipt, salary clearing accounts and exceptionally for some tax accounts. When the nature of business transactions recorded on a G/L account changes due to legal or business changes, one must adopt the G/L account master data. Typical examples include the following: when there is a need to reconcile balance of G/L account with line items, reporting of taxes paid to request for refunds or an unused G/L account is being used for accommodating a new business functionality, and the like.

A user may change the account master data 'Open item management' flag to enable account clearing. When making such a change, there may be a warning/error thrown which is simply overlooked by the user. This change may have a technical impact at the database level, business impact as some of the business processes get disrupted, and financial impact due to loss of time and inconsistent information in the system. For example, the change to 'Open item management' may impact the clearing process, among other processes, as the already existing documents will be left uncleared until the data inconsistency is analyzed and corrected.

This might also cause delay in triggering payments which would lead to considerable financial loss by way of missing discounts or, in some cases, fines for late payments. In cases where a business process (which is not directly connected) fails, there will be a delay in completing the process while the underlying data inconsistency is identified and corrected. It also impacts other processes like payments/reversals, reconciliation of account balance with open line items and impact overall closing processes in the system.

The change in value of a table field will disturb data harmony in a relational database. For example, the data in the database for already posted documents will be out of sync with the modified data, causing unavoidable hindrance in key processes. Also, missing document splitting information for a document will make it ineligible to participate in the clearing process. These inconsistencies may be identified and corrected manually using expertise after a problem is reported to a system administrator via a ticketing system.

As described herein, data consistency is improved by keeping a constant watch on various master data changes, one of the major sources of inconsistencies, and taking necessary actions based on further assessments. Using master data change as initial lead, the inconsistencies would be identified, so long as they are not mere database or technical inconsistencies. Along with the primary option of inconsistency checks based on master data changes, options to scan the system based on overall run and run-per-selection, or application level specific checks, will be provided.

Inconsistencies may be identified proactively by collecting the master data changes performed in systems done in a certain identified period, highlighting the severity of such a change. Analysis is performed based on the master data changes identifying the inconsistencies and classifying them based on the business impact. An option is provided to correct the inconsistencies. When corrections cannot be performed by existing rules and logic, a provision to raise a ticket will be provided. This later may be handled via expert analysis and recommendation. With a machine learning based programming model the system learns from user decision patterns. Accordingly, a confidence score for the respective inconsistency may be presented. The confidence score can be used to automate the process of correction without seeking user consent. The users may receive updated and detailed application logs that are also required for legal and obligatory purposes. A manual roll back option may be provided.

Thus, using the systems and methods described herein, insights and impact information are presented to a user to enable the user to first focus on more important inconsistencies. Additionally, some data inconsistencies may be automatically corrected with reduced user involvement.

FIG. 1 is a network diagram illustrating an example network environment 100 suitable for a data consistency analyzer. The network environment 100 includes a cloud application provider 110, client devices 150A and 150B, and a network 165. The cloud application provider 110 provides applications 125A, 125B, 125C, and 125D using application servers 120A and 120B. The applications 125A-125D (and other applications) may be dynamically allocated among the application servers 120A-120B, as well as other application servers. Each application 125 includes application logic, denoted in FIG. 1, with reference to application logic 130A-130D. The cloud application provider 110 also uses a database server 140 that provides access to a database 145. The applications 125A-125C interact with the client devices 150A and 150B via a web interface 155 or an application interface 160.

Figure 12:
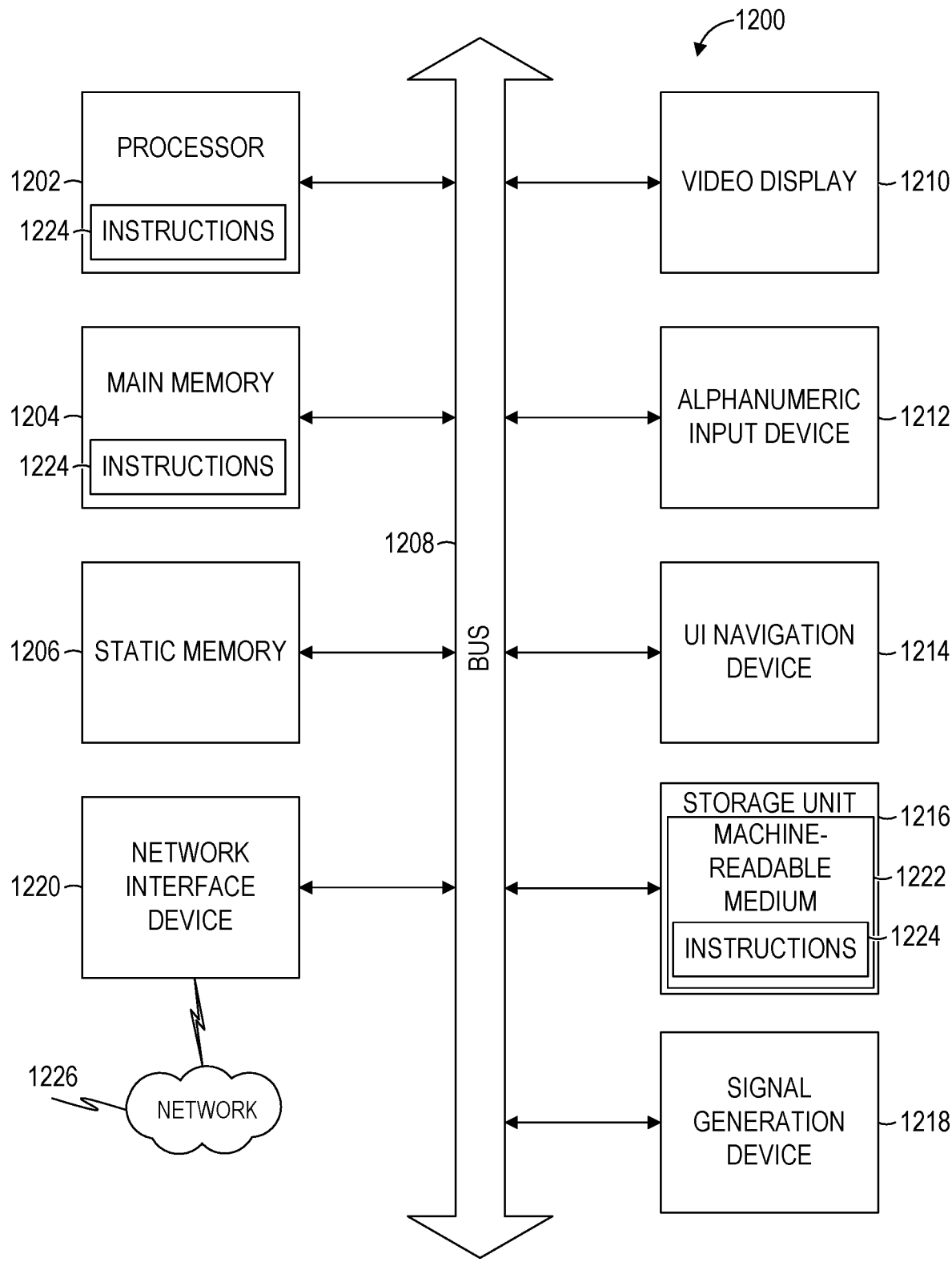
FIG. 12 is a block diagram of a machine in the example form of a computer system within which instructions may be executed for causing the machine to perform any one or more of the methodologies discussed herein.

The application servers 120A-120B, the database server 140, and the client devices 150A-150B may each be implemented in a computer system, in whole or in part, as described in the detailed description of FIG. 12. Like elements denoted with alphabetic suffixes may be referenced collectively or generically using the numeric reference without a suffix. For example, the client devices 150A and 150B may be referred to collectively as client devices 150 or generically as a client device 150.

The application logic 130 of each application 125 provides application-specific instructions to the corresponding application server 120. For example, a report-generating application may receive user selections of data to be included in a report, access data from a database, process the data to generate the report, and cause a user interface to be presented on a client device 150. In this example, the user interface includes the report.

The cloud application provider 110 may be a multi-tenant application provider, such that multiple tenants (also referred to as customers) are associated with the applications 125. For example, the application 125A may be associated with a first tenant and the application 125B may be associated with a second tenant. Each of the applications 125 may be accessible only by user accounts associated with the tenant for the application 125.

An application 125 may be a data consistency analyzer application. The data consistency analyzer application analyzes data in the database 145 for consistency, modifies inconsistent data to restore consistency, causes a user interface to be presented to allow a user to control data modification to restore consistency, or any suitable combination thereof. An example of inconsistent data is invoice data for a first amount in a first currency and corresponding payment data for the first amount in a second currency. To resolve the inconsistency, the currency information of the payment data may be modified to match the currency information of the corresponding invoice data.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed in the detailed description for FIG. 12. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices. For example, the functionality of the cloud application provider 110 may instead be integrated into the client devices 150 to provide on-premises functionality.

The application servers 120, the database server 140, and the client devices 180 are connected by the network 165. The network 165 may be any network that enables communication between or among machines, databases, and devices. Accordingly, the network 165 may be a wired network, a wireless network (e.g., a mobile or cellular network), or any suitable combination thereof. The network 165 may include one or more portions that constitute a private network, a public network (e.g., the Internet), or any suitable combination thereof.

Figure 2:
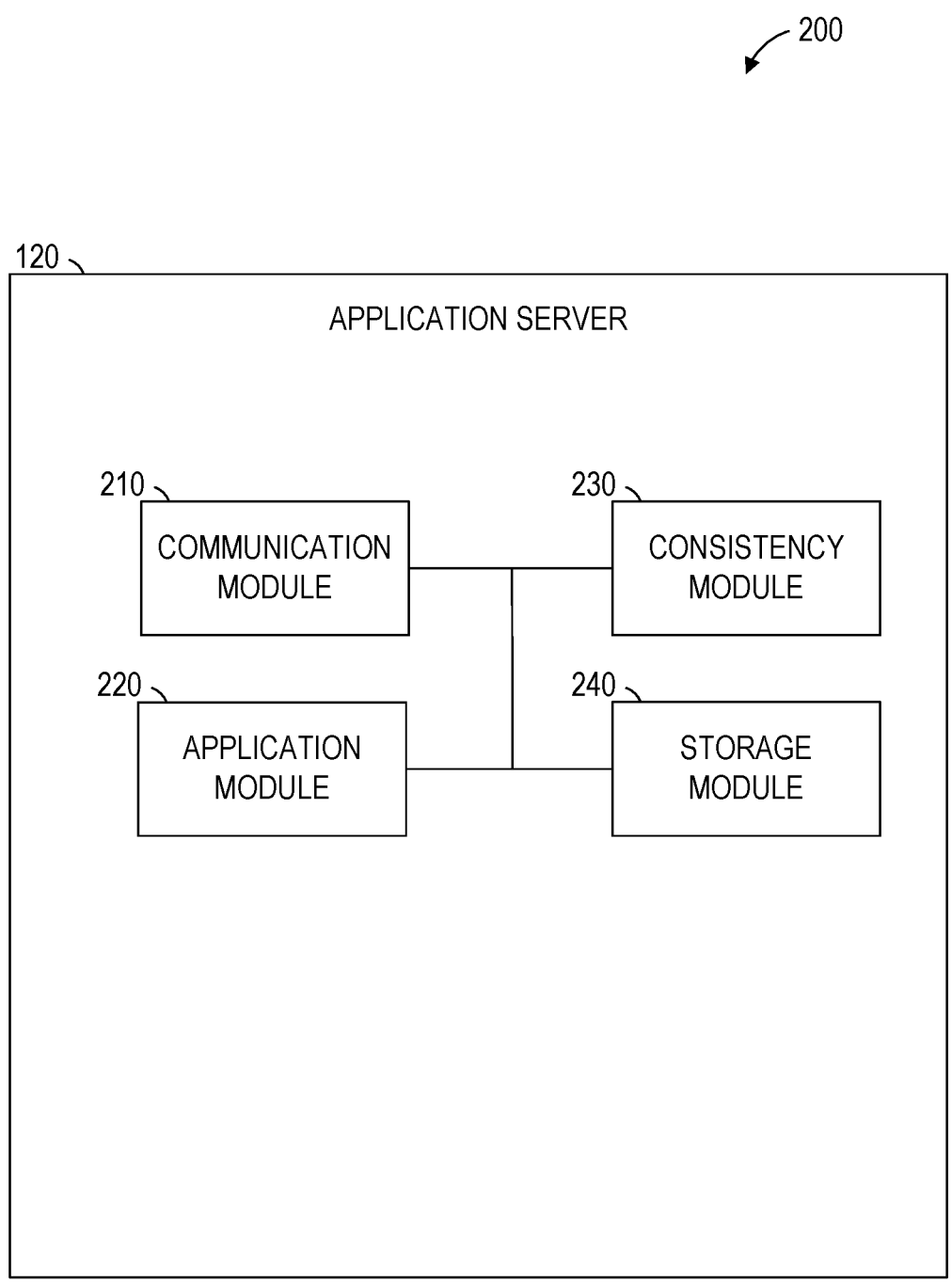
FIG. 2 is a block diagram of an example application server suitable for providing a data consistency analyzer.

FIG. 2 is a block diagram of an example application server 120 of FIG. 1 suitable for providing a data consistency analyzer. The application server 120 is shown as including a communication module 210, an application module 220, a consistency module 230, and a storage module 240, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, modules described herein as being implemented within a single machine, database, or device may be distributed across multiple machines, databases, or devices.

The communication module 210 receives data sent to the application server 120 and transmits data from the application server 120. For example, the communication module 210 may receive, from the client device 150A or 150B of FIG. 1, a request to perform data consistency analysis. Communications sent and received by the communication module 210 may be intermediated by the network 165.

The application module 220 provides the application 125A or 125B of FIG. 1, which may be any application. The consistency module 230 accesses data in the database 145, identifies inconsistencies and either corrects the inconsistencies automatically, or prompts a user to correct the inconsistencies.

The storage module 240 may store data locally in the application server 120 for the applications 125 (e.g., in a hard drive, solid state drive (SSD), random access memory (RAM), or any suitable combination thereof), remotely (e.g., in a network attached storage (NAS) device, database server, or any suitable combination thereof), or any suitable combination thereof.

FIG. 3 is a block diagram of an example database schema 300 suitable for access by a data consistency analyzer. The database schema 300 includes a transaction table 310. The transaction table 310 includes rows 330A, 330B, 330C, 330D, 330E, and 330F in a format 320.

Each row of the transaction table 310 stores an identifier, a type, a value, a currency, and an open item flag. The identifier may be an identifier of a transaction. The type may be an identifier of a type of the transaction (e.g., an invoice or a payment). The date may be a date of the transaction. The value and currency may be the value and currency of the transaction. The open item flag may indicate if the item is open and unavailable for reconciliation, or closed and available for reconciliation.

Thus, the row 330A stores data for an invoice dated Dec. 13, 2020 with a value of $12.05 that is available for reconciliation. The row 330B stores data for a corresponding payment dated Jan. 15, 20221 with a value of $12.05 that is available for reconciliation. The rows 330A-330B are consistent. The row 330C stores data for an invoice dated Feb. 4, 2021 in the amount of $33.33. The row 330D stores data for a payment dated Feb. 4, 2021 in the amount of €33.33. The rows 330C and 330D are inconsistent because the currencies are not the same. The row 330E stores data for an invoice dated Feb. 6, 2021 in the amount of €33.33, with the open item flag set. The row 330F stores data for a payment dated Feb. 7, 2021 in the amount of €33.33. The rows 330E and 330F are inconsistent because one of the rows is not available for reconciliation due to the open item flag being set.

Figure 4:
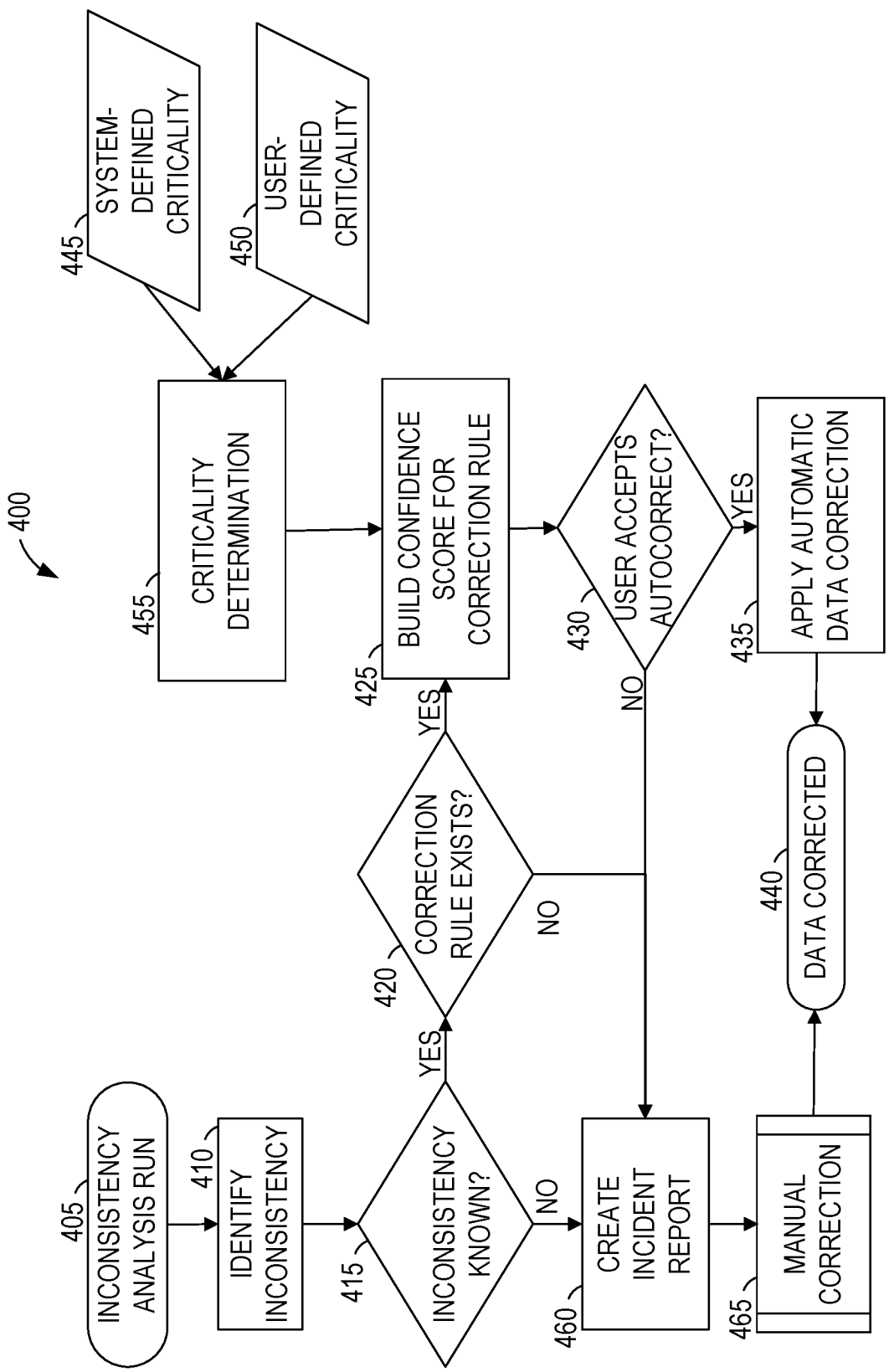
FIG. 4 is a flowchart illustrating operations of an example method suitable for data consistency analysis.

FIG. 4 is a flowchart illustrating operations of an example method 400 suitable for data consistency analysis. The method 400 includes start 405, end 440, operations 410, 415, 420, 425, 430, 435, 455, 460, and 465, and data 445 and 450. By way of example and not limitation, the method 400 is described as being performed by the consistency module 230 of the application server 120 of FIG. 1.

At start 405, an inconsistency analysis run is begun. In operation 410, an inconsistency between two or more data elements is identified. For example, the correspondence between the rows 330C and 330D of FIG. 3 may be identified along with the inconsistency in the currencies.

In operation 415, the consistency module 230 of FIG. 2 determines if the inconsistency is of a known type. If so, the method 400 proceeds to operation 420. If not, the method 400 proceeds with operation 460.

The consistency module 230, in operation 420, determines is a correction rule exists for the type of the inconsistency. For example, incorrect currency in payments may be a known type of inconsistency, and modifying the payment to match the currency of the corresponding invoice may be a correction rule for that type of inconsistency. Thus, the modifying of the record may comprise changing a type of currency of the record. As other examples, the modifying of the record comprises changing an amount of currency of the record or changing an open item management option. If the correction rule is known, the method 400 proceeds with operation 425. If not, the method 400 proceeds with operation 460.

In operation 425, a confidence score is determined for the correction rule. For example, data from the two inconsistencies may be used as input to a trained machine learning model (e.g., a machine learning model of FIG. 9, discussed below). The output of the trained machine learning model may be a probability that application of the correction rule will correctly resolve the inconsistency. The correction to be applied using the correction rule, the confidence score for the correction rule, or both may be presented on a user interface to a user. The user interface may allow the user to accept an automatic correction of the inconsistency by applying the correction generated by the correction rule (operation 430). If the user accepts the autocorrection, the automatic data correction is applied in operation 435 and the method 400 completes at end 440. If the user rejects the autocorrection, the method 400 proceeds with operation 460.

Operation 460 is reached when an inconsistency cannot be automatically corrected. This may occur because the inconsistency is not of a known type, because a correction rule for the known type of the inconsistency does not exist, or because a user rejects application of the correction rule. In any of these cases, the consistency module 230 creates an incident report. For example, information about the data inconsistency may be sent to a system administrator or manager for further investigation. After the incident report is created, an assigned expert manually corrects the data inconsistency in operation 465. Thereafter, the data has been corrected and the method 400 completes at end 440.

As discussed above, a machine learning model may be used in operation 425 to determine a confidence score for the correction rule. Data 445 (system-defined criticality) and data 450 (user-defined criticality) may be used as input data to determine a criticality of various types of data inconsistency, in operation 455. The criticality of the type of inconsistency may be used as an input to the machine learning model to determine the confidence score.

Figure 5:
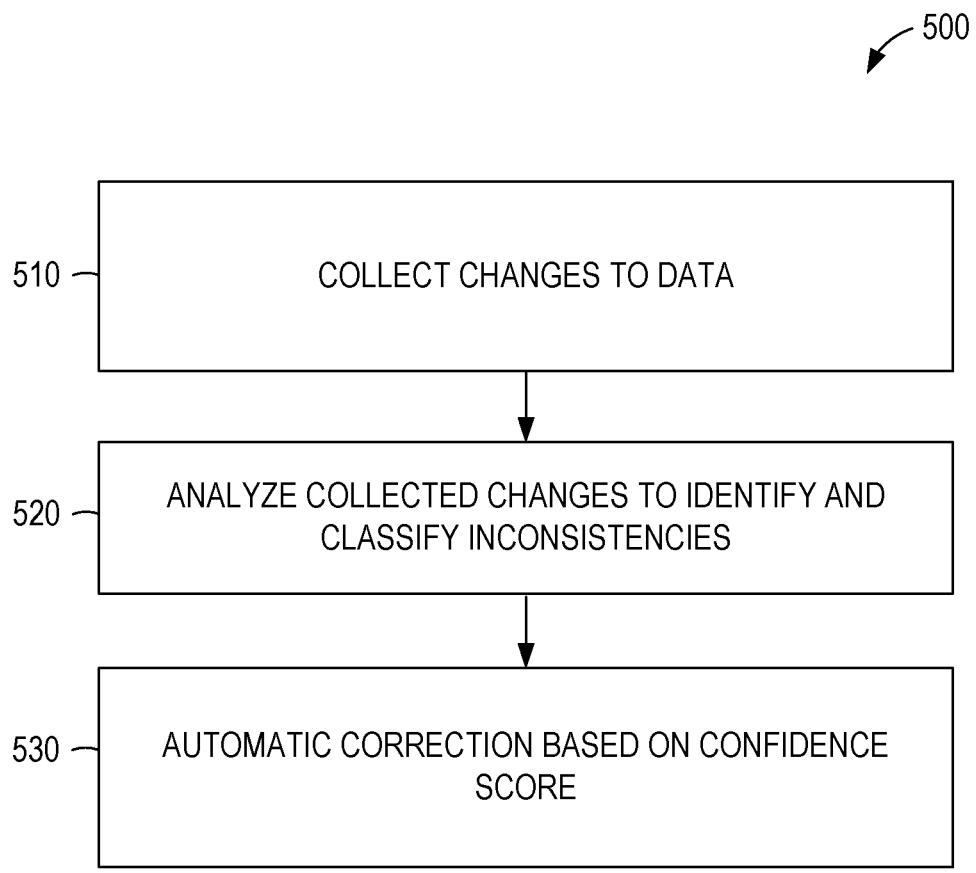
FIG. 5 is a flowchart illustrating operations of an example method suitable for data consistency analysis.

FIG. 5 is a flowchart illustrating operations of an example method 500 suitable for data consistency analysis. The method 500 includes operations 510, 520, and 530. By way of example and not limitation, the method 500 is described as being performed by the consistency module 230 of FIG. 2 of the application server 120 of FIG. 1.

In operation 510, the consistency module 230 collects changes to data. For example, all data changes in a system within a certain identified period may be identified.

The consistency module 230, in operation 520, analyzes the collected changes, identifies inconsistencies, and classifies the inconsistencies based on an impact of the inconsistencies. For example, a dollar value of failing to resolve each inconsistency may be determined and used to classify the inconsistency.

An automatic correction of one or more of the inconsistencies may be performed by the consistency module 230 based on a confidence score (operation 530). For example, a machine learning model may determine a recommended correction based on past identified inconsistencies and user-applied corrections. A confidence score for the likelihood that the recommended correction is correct may also be generated by the machine learning model or a second machine learning model. If the confidence score exceeds a predetermined threshold (e.g., 70%), the correction may be automatically applied without human intervention. Otherwise, a user interface may be presented that includes the recommended correction and the confidence score. The user may choose to apply the recommended correction or apply a manual correction.

Figure 6:
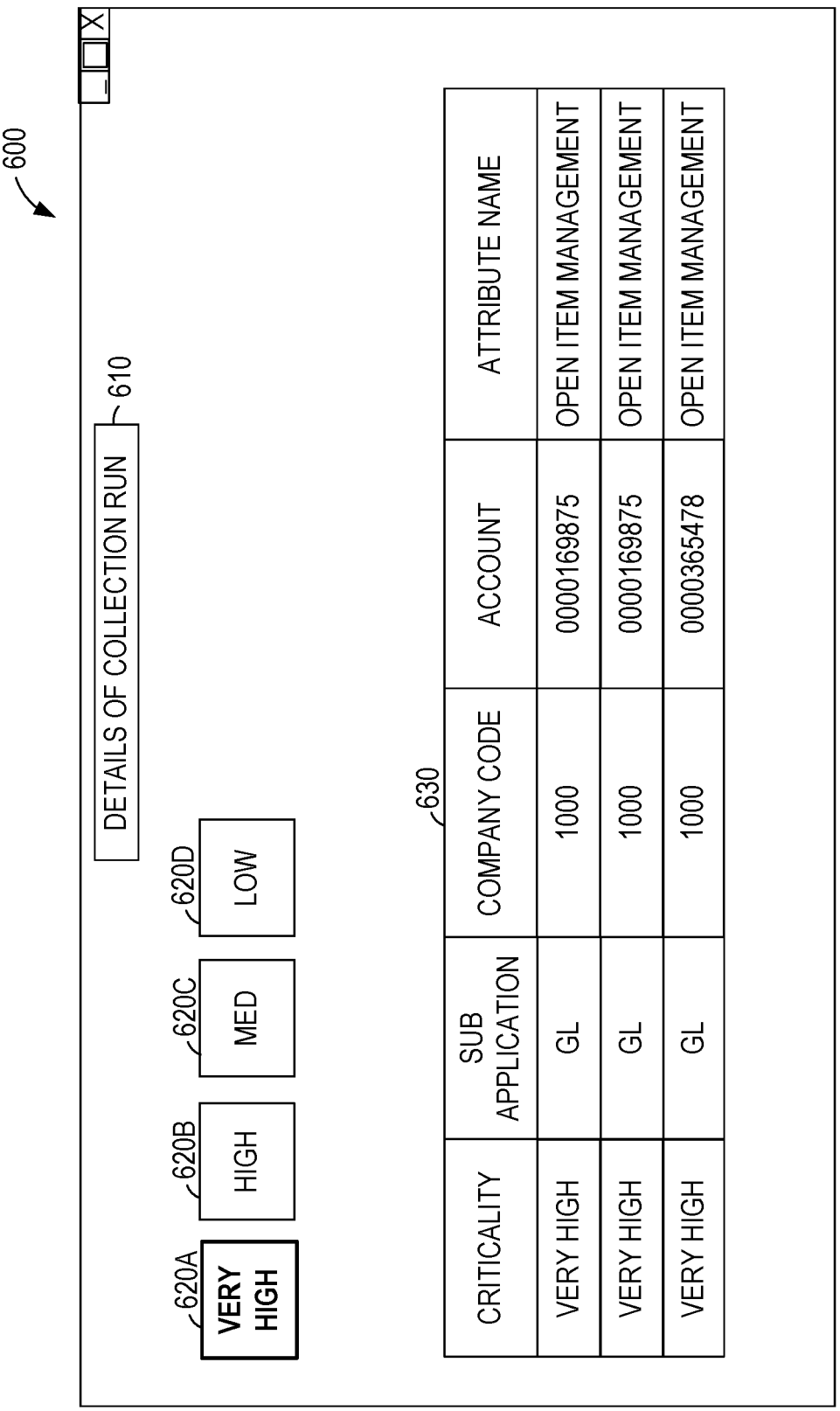
FIG. 6 is a block diagram illustrating a user interface suitable for use by a data consistency analyzer.

FIG. 6 is a block diagram illustrating a user interface 600 suitable for use by a data consistency analyzer. The user interface 600 includes a title 610, severity indicators 620A, 620B, 620C, and 620D, and a table 630. The user interface 600 may be displayed after operations 510 and 520 of the method 500 of FIG. 5 have been performed, in which data inconsistencies are identified.

The title 610 indicates that the user interface 600 displays details of a collection run. The severity indicators 620A-620D indicate four severities in a range of low to very high. The severity indicator 620A is presented in bold, indicating that the data in the table 630 is for inconsistencies that have very high severity. The severity indicators 620A-620D may be operable to change the selected severity and to cause different information to be displayed in the table 630.

The table 630 shows a criticality, a sub-application identifier, a company code, an account, and an attribute name for each identified inconsistency. In the example of FIG. 6, the three identified inconsistencies have very high criticality, are part of the general ledger sub-application, are for company code 1000, and have an inconsistency related to the open item management attribute. Two of the inconsistencies are for account 0000169875 and the remaining inconsistency is for account 000365478.

The user interface 600 may be displayed after receiving, via a user interface, a company code (e.g., the company code 1000). The set of records displayed in the table 630 may be determined based on the company code. For example, the transaction table 310 may include a company code column and only results having a company code value that matches the received company code may be selected for display in the table 630.

Figure 7:
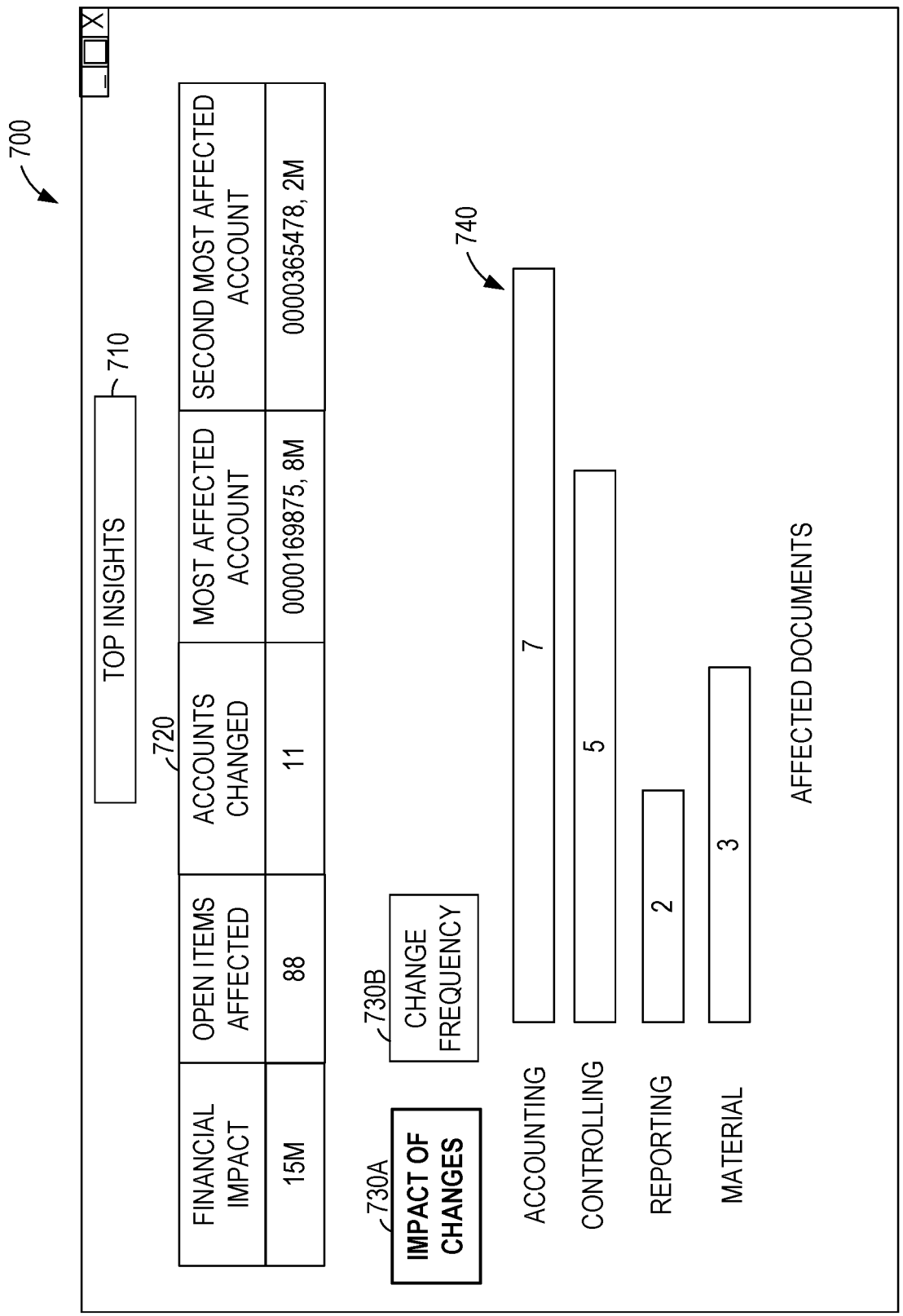
FIG. 7 is a block diagram illustrating a user interface suitable for use by a data consistency analyzer.

FIG. 7 is a block diagram illustrating a user interface 700 suitable for use by a data consistency analyzer. The user interface 700 includes a title 710, a table 720, data indicators 730A and 730B, and information area 740. The user interface 700 may be presented after an analysis run is completed and inconsistencies in the data are identified. Not all inconsistencies may be detrimental, which may be indicated in the user interface 700.

The title 710 indicates that the user interface 700 is presenting the top insights from an analysis run. The table 720 displays aggregate information about the inconsistencies. In the example of FIG. 7, the table 720 identifies the total financial impact, the number of open items affected, the number of accounts affected, the most affected account and the amount of the impact on that account, and the second most affected account and the amount of the impact on that account.

The data indicators 730A and 730B may be operable to select which information is presented in the information area 740. The data indicator 730A is presented in bold, showing that the data indicator 730A is currently selected and the information area 740 is showing the impact of proposed changes to correct data inconsistencies.

The information area 740 shows that applying the proposed changes will affect seven accounting documents, five controlling documents, two reporting documents, and three material documents.

Figure 8:
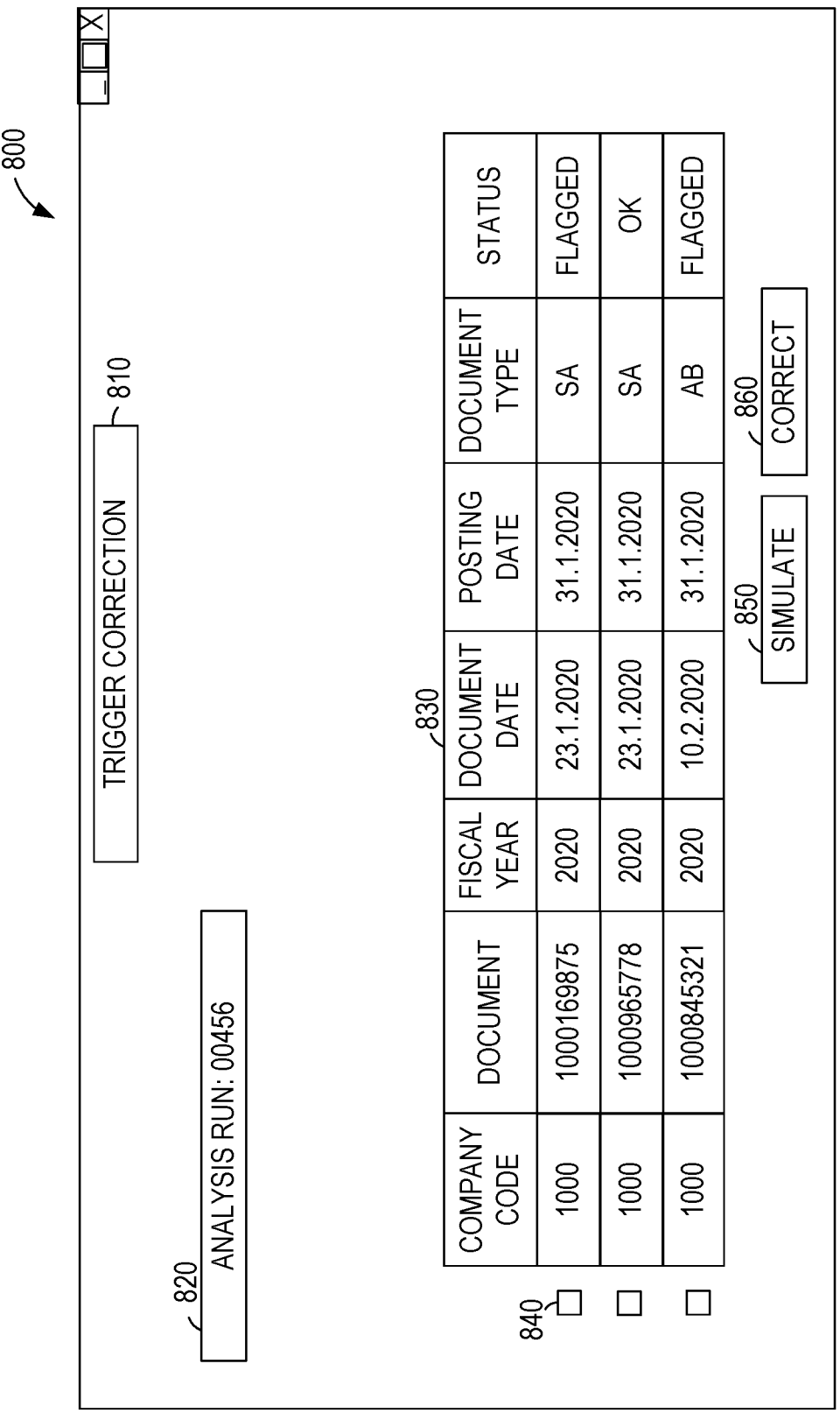
FIG. 8 is a block diagram illustrating a user interface suitable for use by a data consistency analyzer.

FIG. 8 is a block diagram illustrating a user interface 800 suitable for use by a data consistency analyzer. The user interface 800 includes a title 810, an analysis run identifier 820, a table 830, checkboxes 840, a button 850, and a button 860. The user interface 800 may be presented after the user interface 700 of FIG. 7 to allow the user the option to correct inconsistencies.

The title 810 indicates that the user interface 800 allows a user to trigger correction of data inconsistencies. The analysis run identifier 820 indicates that the data in the table 830 is for analysis run 00456. The table 830 shows a company code, a document identifier, a fiscal year, a document date, a posting date, a document type, and a status for at least a subset of the analyzed documents. The checkboxes 840 are operable to select which documents should be corrected.

After selecting the checkboxes 840 for the documents to be corrected, the user presses the button 850 to simulate the application of the corrections or the button 860 to apply the corrections. In response to receiving the input via the user interface, the consistency module 230 of FIG. 2 determines an effect of applying a modification to one or more records without modifying the records. Thus, by use of the button 850, the user is enabled to see the effect of applying the corrections before actually modifying the data by using the button 860.

Figure 9:
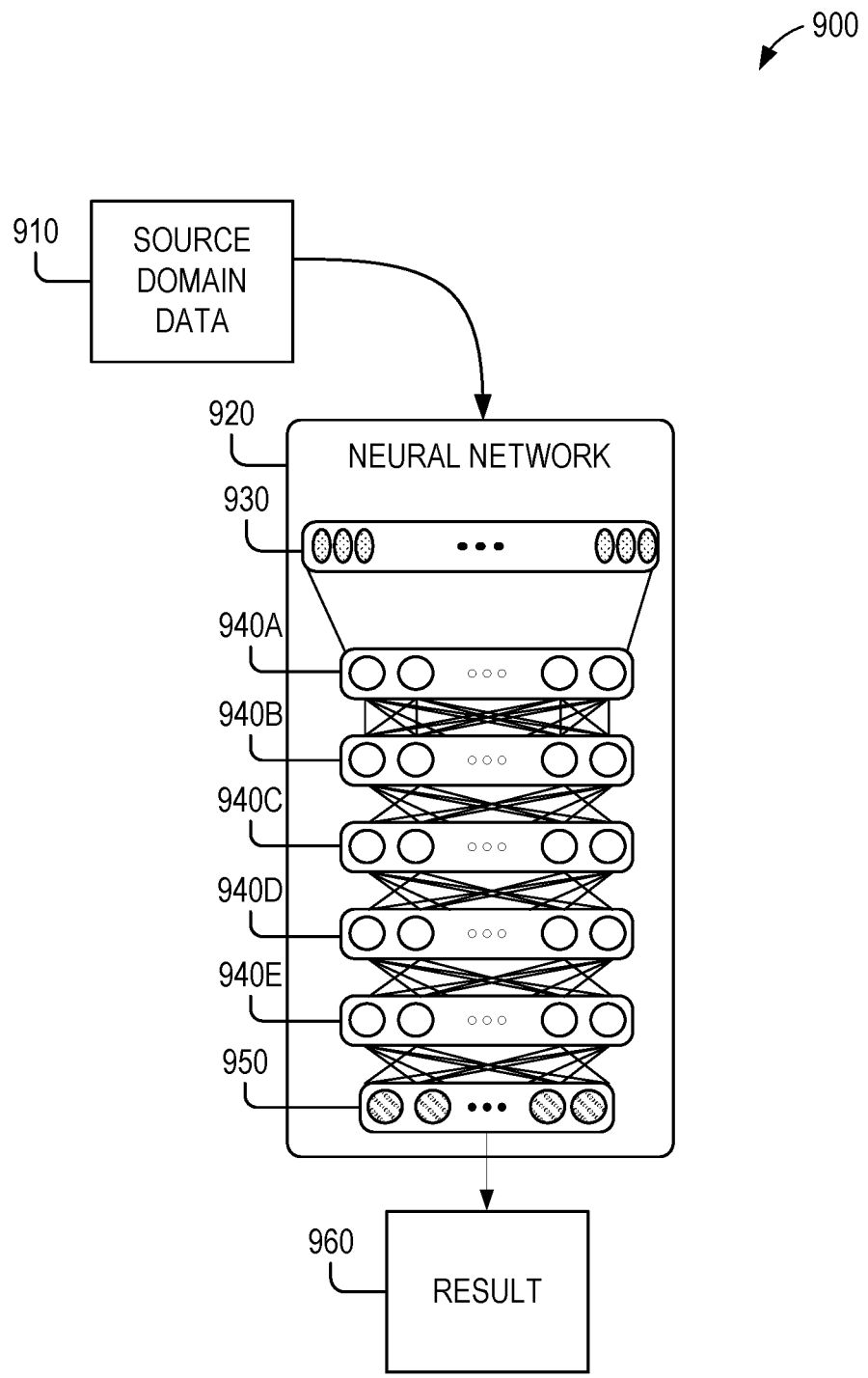
FIG. 9 is a block diagram of an example neural network, suitable for use in suggesting corrections for data inconsistencies.

FIG. 9 illustrates the structure of an example neural network 920. The neural network 920 takes source domain data 910 as input, processes the source domain data 910 using the input layer 930; the intermediate, hidden layers 940A, 940B, 940C, 940D, and 940E; and the output layer 950 to generate a result 960.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and having learnt the object and name, may use the analytic results to identify the object in untagged images.

A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

Each of the layers 930-950 comprises one or more nodes (or "neurons.") The nodes of the neural network 920 are shown as circles or ovals in FIG. 9. Each node takes one or more input values, processes the input values using zero or more internal variables, and generates one or more output values. The inputs to the input layer 930 are values from the source domain data 910. The output of the output layer 950 is the result 960. The intermediate layers 940A-940E are referred to as "hidden" because they do not interact directly with either the input or the output, and are completely internal to the neural network 920. Though five hidden layers are shown in FIG. 9, more or fewer hidden layers may be used.

A model may be run against a training dataset for several epochs, in which the training dataset is repeatedly fed into the model to refine its results. In each epoch, the entire training dataset is used to train the model. Multiple epochs (e.g., iterations over the entire training dataset) may be used to train the model. The number of epochs may be 10, 100, 500, 1000, or another number. Within an epoch, one or more batches of the training dataset are used to train the model. Thus, the batch size ranges between 1 and the size of the training dataset, while the number of epochs is any positive integer value. The model parameters are updated after each batch (e.g., using gradient descent).

In a supervised learning phase, a model is developed to predict the output for a given set of inputs and is evaluated over several epochs to more reliably provide the output that is specified as corresponding to the given input for the greatest number of inputs for the training dataset. The training dataset comprises input examples with labeled outputs. For example, a user may label images based on their content and the labeled images used to train an image identifying model to generate the same labels.

For self-supervised learning, the training dataset comprises self-labeled input examples. For example, a set of color images could be automatically converted to black-and-white images. Each color image may be used as a "label" for the corresponding black-and-white image, and used to train a model that colorizes black-and-white images. This process is self-supervised because no additional information, outside of the original images, is used to generate the training dataset. Similarly, when text is provided by a user, one word in a sentence can be masked, and the network trained to predict the masked word based on the remaining words.

Each model develops a rule or algorithm over several epochs by varying the values of one or more variables affecting the inputs in order to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model, satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. The finalized models may be evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusters is used to select a model that produces the clearest bounds for its clusters of data.

The neural network 920 may be a deep learning neural network, a deep convolutional neural network, a recurrent neural network, or another type of neural network. A neuron is an architectural element used in data processing and artificial intelligence, particularly machine learning. A neuron implements a transfer function by which a number of inputs are used to generate an output. The inputs may be weighted and summed, with the result compared to a threshold to determine if the neuron should generate an output signal (e.g., a 1) or not (e.g., a 0 output). Through the training of a neural network, the inputs of the component neurons are modified. One of skill in the art will appreciate that neurons and neural networks may be constructed programmatically (e.g., via software instructions) or via specialized hardware linking each neuron to form the neural network.

An example layer in the neural network 920 is a Long Short Term Memory (LSTM) layer. An LS™ layer includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

The structure of each layer may be predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

One of ordinary skill in the art will be familiar with several machine learning algorithms that may be applied with the present disclosure, including linear regression, random forests, decision tree learning, neural networks, deep neural networks, genetic or evolutionary algorithms, and the like.

Figure 10:
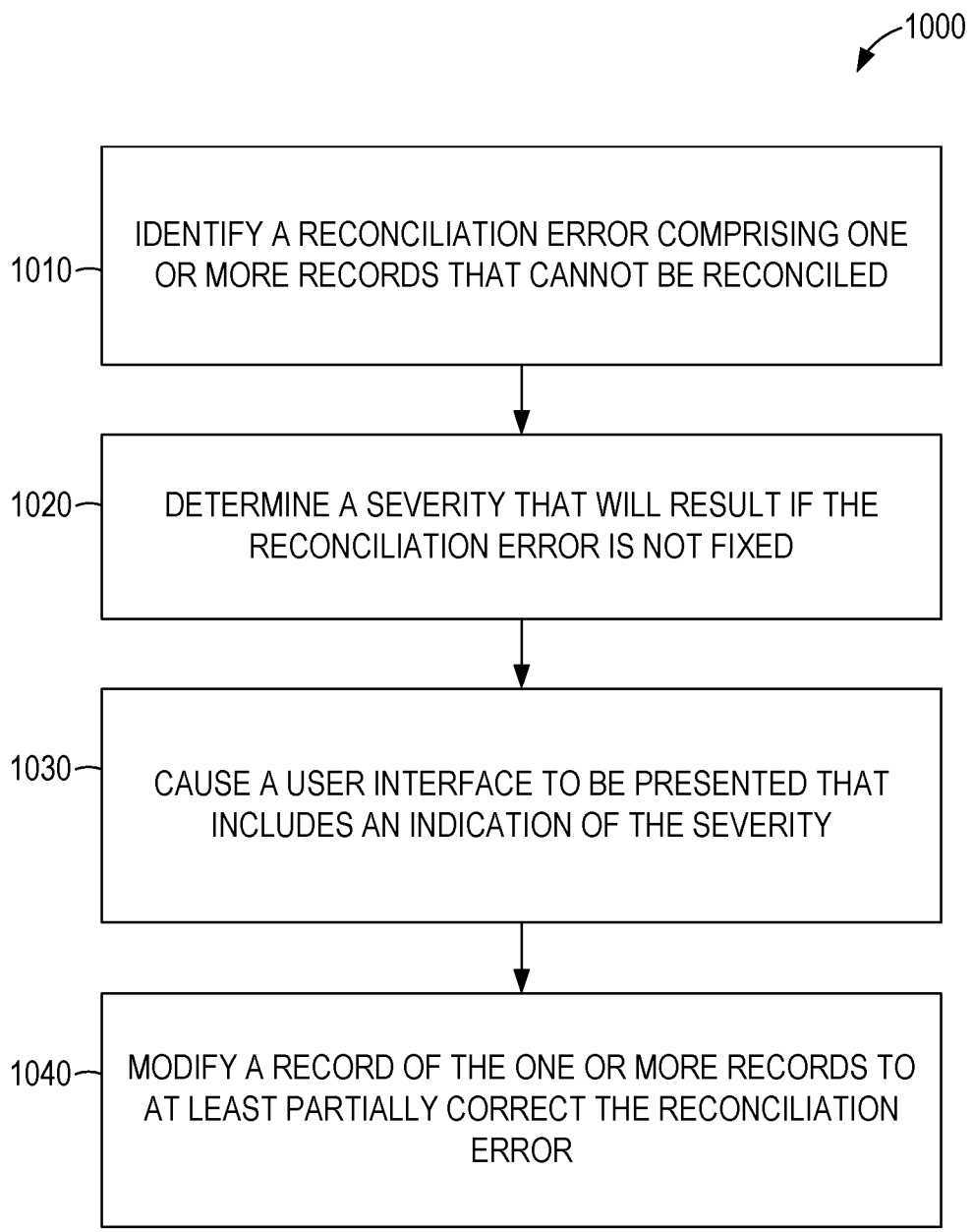
FIG. 10 is a flowchart illustrating operations of an example method suitable for data consistency analysis.

FIG. 10 is a flowchart illustrating operations of an example method 1000 suitable for data consistency analysis. The method 1000 includes operations 1010, 1020, 1030, and 1040. By way of example and not limitation, the method 1000 is described as being performed by the consistency module 230 of FIG. 2 of the application server 120 of FIG. 1.

In operation 1010, the consistency module 230 identifies a reconciliation error comprising one or more records that cannot be reconciled. For example, the reconciliation error may comprise the records of the rows 330C and 330D of FIG. 3, which cannot be reconciled due to mismatched currencies. The identification of the reconciliation error may be performed by a trained machine learning model such as the neural network 920 of FIG. 9. The machine learning model may be trained using historical data and human- or algorithmically-identified data inconsistencies.

The consistency module 230, in operation 1020, determines a severity that will result if the reconciliation error is not fixed. For example, the severity may be based on the value of a transaction that cannot be reconciled. For the rows 330C-330D, the value of the unreconcilable transaction is $33.33, €33.33, the sum of those two values, the average of those two values, or any suitable combination thereof.

In operation 1030, the consistency module 230 causes a user interface to be presented that includes an indication of the severity. For example, the user interface 600 may be presented, in which the criticality column of the table 630 indicates the criticality for each of multiple reconciliation errors. As another example, the user interface 700 of FIG. 7 may be presented, in which the financial impact shown in table 720 of FIG. 7 identifies an indication of the aggregate severity of multiple reconciliation errors.

The consistency module 230 modifies a record of the one or more records to at least partially correct the reconciliation error (operation 1040). For example, the record of the row 330D of FIG. 3 may be modified by changing the currency from euros to dollars, allowing the rows 330C and 330D of FIG. 3 to be reconciled. The modification applied to the record may be generated by a trained machine learning model such as the neural network 920 of FIG. 9. The machine learning model may be trained using historical records comprising unreconcilable data and the modifications applied to correct the data inconsistency (e.g., modifications applied by a human in the past). Thus, the consistency module 230 may train a machine learning model with a training set that comprises the record and a modification applied when modifying the record to at least partially correct the reconciliation error.

In view of the herein described implementations of subject matter, this application discloses the following list of examples, wherein one feature of an example in isolation or more than one feature of an example, taken in combination and, optionally, in combination with one or more features of one or more further examples are further examples also falling within the disclosure of this application.

Example 1 is a method comprising: identifying, by one or more processors, a reconciliation error comprising one or more records of a set of records that cannot be reconciled; determining, by the one or more processors, a severity that will result if the reconciliation error is not fixed; causing a user interface to be presented that includes, an indication of the severity; and modifying a record of the one or more records to at least partially correct the reconciliation error.

In Example 2, the subject matter of Example 1 includes receiving, via a user interface, a company code; and determining the set of records based on the company code.

In Example 3, the subject matter of Examples 1-2 includes determining an effect of applying a modification to the record without modifying the record.

In Example 4, the subject matter of Examples 1-3, wherein the modifying of the record is in response to receiving an input via the user interface.

In Example 5, the subject matter of Examples 1-4, wherein the modifying of the record is based on an output from a trained machine learning model.

In Example 6, the subject matter of Examples 1-5 includes training a machine learning model with a training set that comprises the record and a modification applied when modifying the record to at least partially correct the reconciliation error.

In Example 7, the subject matter of Examples 1-6, wherein the modifying of the record comprises changing an amount of currency of the record.

In Example 8, the subject matter of Examples 1-7, wherein the modifying of the record comprises changing a type of currency of the record.

In Example 9, the subject matter of Examples 1-8, wherein the modifying of the record comprises changing an open item management option.

Example 10 is a device comprising: a memory that stores instructions; and one or more processors configured by the instructions to perform operations comprising: identifying a reconciliation error comprising one or more records of a set of records that cannot be reconciled; determining a severity that will result if the reconciliation error is not fixed; causing a user interface to be presented that includes, an indication of the severity; and modifying a record of the one or more records to at least partially correct the reconciliation error.

In Example 11, the subject matter of Example 10, wherein the operations further comprise: receiving, via a user interface, a company code; and determining the set of records based on the company code.

In Example 12, the subject matter of Examples 10-11, wherein the operations further comprise: determining an effect of applying a modification to the record without modifying the record.

In Example 13, the subject matter of Examples 10-12, wherein the modifying of the record is in response to receiving an input via the user interface.

In Example 14, the subject matter of Examples 10-13, wherein the modifying of the record is based on an output from a trained machine learning model.

In Example 15, the subject matter of Examples 10-14, wherein the operations further comprise: training a machine learning model with a training set that comprises the record and a modification applied when modifying the record to at least partially correct the reconciliation error.

In Example 16, the subject matter of Examples 10-15, wherein the modifying of the record comprises changing an amount of currency of the record.

In Example 17, the subject matter of Examples 10-16, wherein the modifying of the record comprises changing a type of currency of the record.

Example 18 is a non-transitory computer-readable medium that stores instructions that, when executed by one or more processors of a device, cause the one or more processors to perform operations comprising: identifying a reconciliation error comprising one or more records of a set of records that cannot be reconciled; determining a severity that will result if the reconciliation error is not fixed; causing a user interface to be presented that includes, an indication of the severity; and modifying a record of the one or more records to at least partially correct the reconciliation error.

In Example 19, the subject matter of Example 18, wherein the operations further comprise: receiving, via a user interface, a company code; and determining the set of records based on the company code.

In Example 20, the subject matter of Examples 18-19, wherein the operations further comprise: determining an effect of applying a modification to the record without modifying the record.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Figure 11:
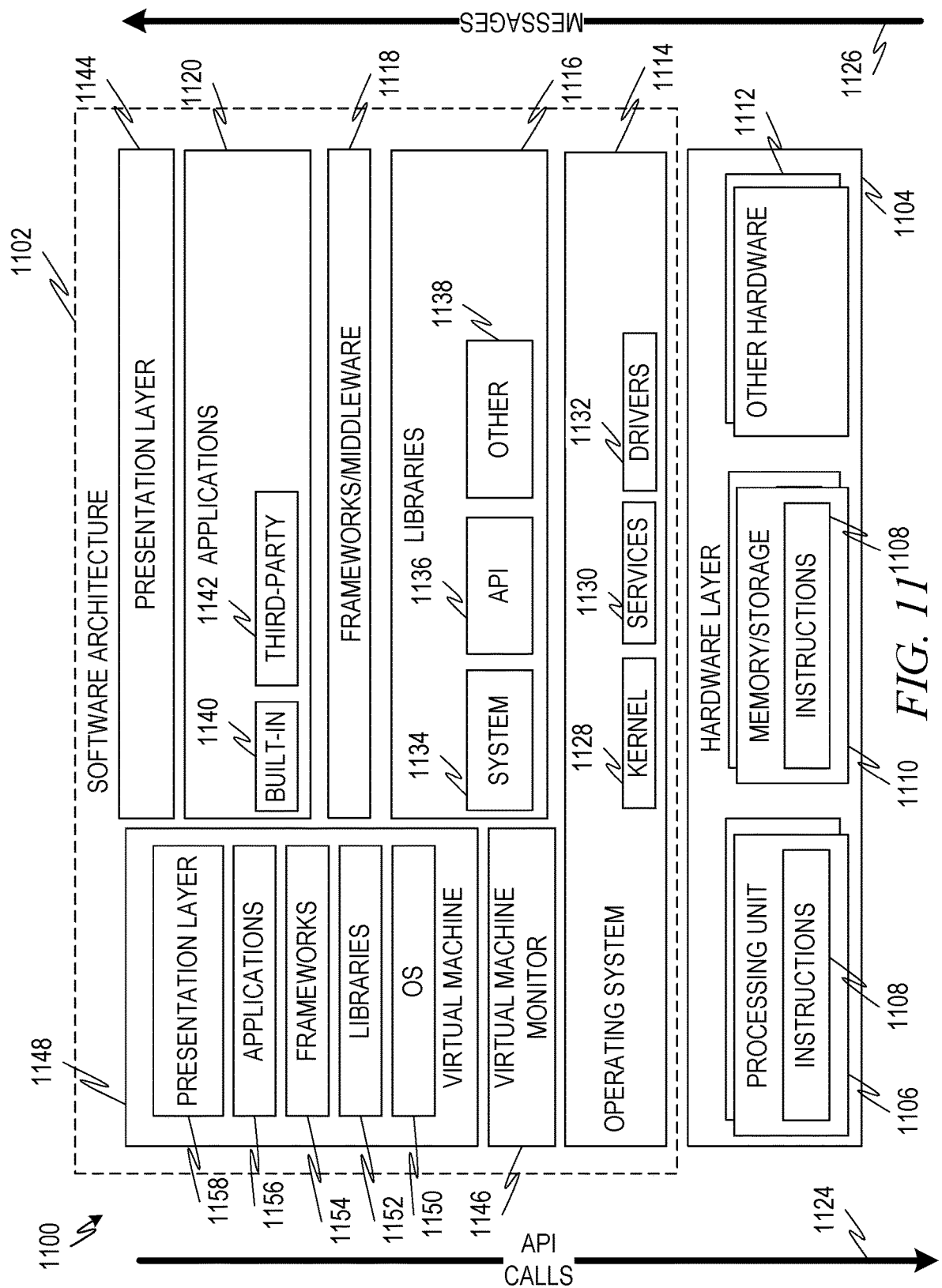
FIG. 11 is a block diagram showing one example of a software architecture for a computing device.

FIG. 11 is a block diagram 1100 showing one example of a software architecture 1102 for a computing device. The software architecture 1102 may be used in conjunction with various hardware architectures, for example, as described herein. FIG. 11 is merely a non-limiting example of a software architecture, and many other architectures may be implemented to facilitate the functionality described herein. A representative hardware layer 1104 is illustrated and can represent, for example, any of the above referenced computing devices. In some examples, the hardware layer 1104 may be implemented according to the architecture of the computer system of FIG. 11.

The representative hardware layer 1104 comprises one or more processing units 1106 having associated executable instructions 1108. Executable instructions 1108 represent the executable instructions of the software architecture 1102, including implementation of the methods, modules, subsystems, components, and so forth described herein and may also include memory and/or storage modules 1110, which also have executable instructions 1108. Hardware layer 1104 may also comprise other hardware as indicated by other hardware 1112 which represents any other hardware of the hardware layer 1104, such as the other hardware illustrated as part of the software architecture 1102.

In the example architecture of FIG. 11, the software architecture 1102 may be conceptualized as a stack of layers where each layer provides a particular functionality. For example, the software architecture 1102 may include layers such as an operating system 1114, libraries 1116, frameworks/middleware 1118, applications 1120, and presentation layer 1144. Operationally, the applications 1120 and/or other components within the layers may invoke application programming interface (API) calls 1124 through the software stack and access a response, returned values, and so forth illustrated as messages 1126 in response to the API calls 1124. The layers illustrated are representative in nature and not all software architectures have all layers. For example, some mobile or special purpose operating systems may not provide a frameworks/middleware 1118 layer, while others may provide such a layer. Other software architectures may include additional or different layers.

The operating system 1114 may manage hardware resources and provide common services. The operating system 1114 may include, for example, a kernel 1128, services 1130, and drivers 1132. The kernel 1128 may act as an abstraction layer between the hardware and the other software layers. For example, the kernel 1128 may be responsible for memory management, processor management (e.g., scheduling), component management, networking, security settings, and so on. The services 1130 may provide other common services for the other software layers. In some examples, the services 1130 include an interrupt service. The interrupt service may detect the receipt of an interrupt and, in response, cause the software architecture 1102 to pause its current processing and execute an interrupt service routine (ISR) when an interrupt is accessed.

The drivers 1132 may be responsible for controlling or interfacing with the underlying hardware. For instance, the drivers 1132 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 1116 may provide a common infrastructure that may be utilized by the applications 1120 and/or other components and/or layers. The libraries 1116 typically provide functionality that allows other software modules to perform tasks in an easier fashion than to interface directly with the underlying operating system 1114 functionality (e.g., kernel 1128, services 1130 and/or drivers 1132). The libraries 1116 may include system libraries 1134 (e.g., C standard library) that may provide functions such as memory allocation functions, string manipulation functions, mathematic functions, and the like. In addition, the libraries 1116 may include API libraries 1136 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 1116 may also include a wide variety of other libraries 1138 to provide many other APIs to the applications 1120 and other software components/modules.

The frameworks/middleware 1118 may provide a higher-level common infrastructure that may be utilized by the applications 1120 and/or other software components/modules. For example, the frameworks/middleware 1118 may provide various graphic user interface (GUI) functions, high-level resource management, high-level location services, and so forth. The frameworks/middleware 1118 may provide a broad spectrum of other APIs that may be utilized by the applications 1120 and/or other software components/modules, some of which may be specific to a particular operating system or platform.

The applications 1120 include built-in applications 1140 and/or third-party applications 1142. Examples of representative built-in applications 1140 may include, but are not limited to, a contacts application, a browser application, a book reader application, a location application, a media application, a messaging application, and/or a game application. Third-party applications 1142 may include any of the built-in applications as well as a broad assortment of other applications. In a specific example, the third-party application 1142 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 1142 may invoke the API calls 1124 provided by the mobile operating system such as operating system 1114 to facilitate functionality described herein.

The applications 1120 may utilize built in operating system functions (e.g., kernel 1128, services 1130 and/or drivers 1132), libraries (e.g., system libraries 1134, API libraries 1136, and other libraries 1138), frameworks/middleware 1118 to create user interfaces to interact with users of the system. Alternatively or additionally, in some systems, interactions with a user may occur through a presentation layer, such as presentation layer 1144. In these systems, the application/module "logic" can be separated from the aspects of the application/module that interact with a user.

Some software architectures utilize virtual machines. In the example of FIG. 11, this is illustrated by virtual machine 1148. A virtual machine creates a software environment where applications/modules can execute as if they were executing on a hardware computing device. A virtual machine is hosted by a host operating system (operating system 1114) and typically, although not always, has a virtual machine monitor 1146, which manages the operation of the virtual machine 1148 as well as the interface with the host operating system (i.e., operating system 1114). A software architecture executes within the virtual machine 1148 such as an operating system 1150, libraries 1152, frameworks/middleware 1154, applications 1156 and/or presentation layer 1158. These layers of software architecture executing within the virtual machine 1148 can be the same as corresponding layers previously described or may be different.

Modules, Components and Logic

A computer system may include logic, components, modules, mechanisms, or any suitable combination thereof. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. One or more computer systems (e.g., a standalone, client, or server computer system) or one or more hardware processors may be configured by software (e.g., an application or application portion) as a hardware-implemented module that operates to perform certain operations as described herein.

A hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Hardware-implemented modules may be temporarily configured (e.g., programmed), and each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). Multiple hardware-implemented modules are configured or instantiated at different times. Communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may comprise processor-implemented modules.

Similarly, the methods described herein may be at least partially processor-implemented. For example, at least some of the operations of a method may be performed by one or more processors or processor-implemented modules. The performance of the operations may be distributed among the one or more processors, not only residing within a single machine, but deployed across several machines. The processor or processors may be in a single location (e.g., within a home environment, an office environment, or a server farm), or the processors may be distributed across several locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Electronic Apparatus and System

The systems and methods described herein may be implemented using digital electronic circuitry, computer hardware, firmware, software, a computer program product (e.g., a computer program tangibly embodied in an information carrier, e.g., in a machine-readable medium for execution by, or to control the operation of, data processing apparatus, e.g., a programmable processor, a computer, or multiple computers), or any suitable combination thereof.

A computer program can be written in any form of programming language, including compiled or interpreted languages; and, it can be deployed in any form, including as a standalone program or as a module, subroutine, or other unit suitable for use in a computing environment. A computer program can be deployed to be executed on one computer or on multiple computers at one site or distributed across multiple sites (e.g., cloud computing) and interconnected by a communication network. In cloud computing, the server-side functionality may be distributed across multiple computers connected by a network. Load balancers are used to distribute work between the multiple computers. Thus, a cloud computing environment performing a method is a system comprising the multiple processors of the multiple computers tasked with performing the operations of the method.

Operations may be performed by one or more programmable processors executing a computer program to perform functions by operating on input data and generating output. Method operations can also be performed by, and apparatus of systems may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. A programmable computing system may be deployed using hardware architecture, software architecture, or both. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out example hardware (e.g., machine) and software architectures that may be deployed.

Example Machine Architecture and Machine-Readable Medium

FIG. 12 is a block diagram of a machine in the example form of a computer system 1200 within which instructions 1224 may be executed for causing the machine to perform any one or more of the methodologies discussed herein. The machine may operate as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU), or both), a main memory 1204, and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard or a touch-sensitive display screen), a user interface (UI) navigation (or cursor control) device 1214 (e.g., a mouse), a storage unit 1216, a signal generation device 1218 (e.g., a speaker), and a network interface device 1220.

Machine-Readable Medium

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, with the main memory 1204 and the processor 1202 also constituting machine-readable media 1222.

While the machine-readable medium 1222 is shown in FIG. 12 to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding, or carrying instructions 1224 for execution by the machine and that cause the machine to perform any one or more of the methodologies of the present disclosure, or that is capable of storing, encoding, or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc read-only memory (DVD-ROM) disks. A machine-readable medium is not a transmission medium.

Transmission Medium

The instructions 1224 may further be transmitted or received over a communications network 1226 using a transmission medium. The instructions 1224 may be transmitted using the network interface device 1220 and any one of several well-known transfer protocols (e.g., hypertext transport protocol (HTTP)). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1224 for execution by the machine, and includes digital or analog communications signals or other intangible media to facilitate communication of such software.

Although specific examples are described herein, it will be evident that various modifications and changes may be made to these examples without departing from the broader spirit and scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   identifying, by one or more processors, a data inconsistency in a set of records;
   determining, by the one or more processors, a severity of the data inconsistency;
   causing a user interface to be presented that includes an indication of the severity;
   in response to receiving a first input via the user interface, simulating an effect of applying a modification to a record associated with the data inconsistency;
   displaying the simulated effect of applying the modification to the record; and
   in response to receiving a second input via the user interface, modifying the record to at least partially correct the data inconsistency.

2. The method of claim 1, further comprising:
   receiving, via a second user interface, a company code; and
   determining the set of records based on the company code.

3. The method of claim 1, wherein the modification is based on an output from a trained machine learning model.

4. The method of claim 1, further comprising:
   training a machine learning model with a training set that comprises the record and a corresponding modification applied when modifying the record to at least partially correct the data inconsistency.

5. The method of claim 1, wherein the modification comprises changing an amount of currency of the record.

6. The method of claim 1, wherein the modification comprises changing a type of currency of the record.

7. The method of claim 1, wherein the modification comprises changing an open item management option.

8. A device comprising:
   a memory that stores instructions; and
   one or more processors configured by the instructions to perform operations comprising:
   identifying a data inconsistency in a set of records;
   determining a severity of the data inconsistency;
   causing a user interface to be presented that includes an indication of the severity;
   in response to receiving a first input via the user interface, simulating an effect of applying a modification to a record associated with the data inconsistency;
   displaying the simulated effect of applying the modification to the record; and
   in response to receiving a second input via the user interface, modifying the record to at least partially correct the data inconsistency.

9. The device of claim 8, wherein the operations further comprise:
   receiving, via a second user interface, a company code; and
   determining the set of records based on the company code.

10. The device of claim 8, wherein the modification is based on an output from a trained machine learning model.

11. The device of claim 8, wherein the operations further comprise:

training a machine learning model with a training set that comprises the record and a corresponding modification applied when modifying the record to at least partially correct the data inconsistency.

12. The device of claim 8, wherein the modification comprises changing an amount of currency of the record.

13. The device of claim 8, wherein the modification comprises changing a type of currency of the record.

14. The device of claim 8, wherein the determining of the severity of the data inconsistency is based on a value of a transaction that cannot be reconciled.

15. The device of claim 8, wherein the identifying of the data inconsistency in the set of records comprises identifying a first record for an invoice in an amount in a first currency and a second record for a payment in the amount in a second currency.

16. The device of claim 8, wherein the identifying of the data inconsistency in the set of records comprises identifying a first record for an invoice in an amount in a currency and a second record for a payment in the amount in the currency, wherein the first record has a cleared open item management flag and the second record has a set open item management flag.

17. A non-transitory computer-readable medium that stores instructions that, when executed by one or more processors of a device, cause the one or more processors to perform operations comprising:
identifying a data inconsistency in a set of records;
determining a severity of the data inconsistency;
causing a user interface to be presented that includes an indication of the severity;
in response to receiving a first input via the user interface, simulating an effect of applying a modification to a record associated with the data inconsistency;
displaying the simulated effect of applying the modification to the record; and
in response to receiving a second input via the user interface, modifying the record to at least partially correct the data inconsistency.

18. The non-transitory computer-readable medium of claim 17, wherein the operations further comprise:
receiving, via a second user interface, a company code; and
determining the set of records based on the company code.

19. The non-transitory computer-readable medium of claim 17, wherein the modification is based on an output from a trained machine learning model.

20. The non-transitory computer-readable medium of claim 17, wherein the operations further comprise:
training a machine learning model with a training set that comprises the record and a corresponding modification applied when modifying the record to at least partially correct the data inconsistency.

\* \* \* \* \*